United States Patent [19]

Calhoun et al.

[11] 4,039,162

[45] Aug. 2, 1977

[54] SPOILER CONTROL SYSTEM

[76] Inventors: John T. Calhoun, 10396 Rainier Ave. South, Seattle, Wash. 98178; Sherman E. Hall, 20816-18th Place South, Seattle, Wash. 98188

[21] Appl. No.: 655,620

[22] Filed: Feb. 5, 1976

[51] Int. Cl.² .................... B64C 9/04; B64C 13/32
[52] U.S. Cl. .................... 244/213; 244/83 G; 244/90 A
[58] Field of Search ............. 244/42 R, 42 D, 83 D, 244/83 G, 83 J, 90 A, 83 C, 83 K; 74/469, 480 R, 516, 471 R

[56] References Cited

U.S. PATENT DOCUMENTS 2,494,208   1/1950   Schultz ................ 244/420 X

*Primary Examiner*—Trygve M. Blix
*Assistant Examiner*—Barry L. Kelmachter

[57] ABSTRACT

Control system for aircraft wing spoilers in which the amount of centering moment provided by the downwardly moving or aerodynamically inactive spoiler is increased as the aircraft flaps are extended, the control system including a differential linkage mechanism interconnecting the flaps and the spoiler actuating mechanism. In effect different schedules of spoiler motion in response to cockpit control inputs are generated with wing flaps in different positions.

10 Claims, 16 Drawing Figures

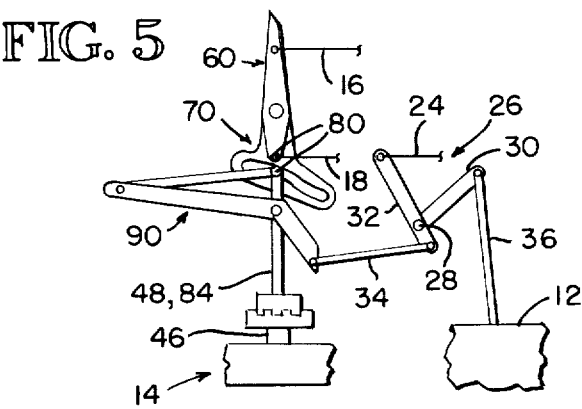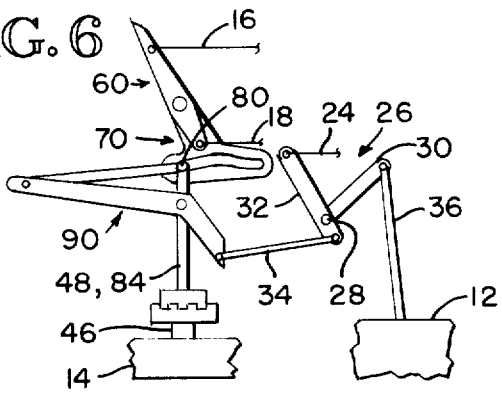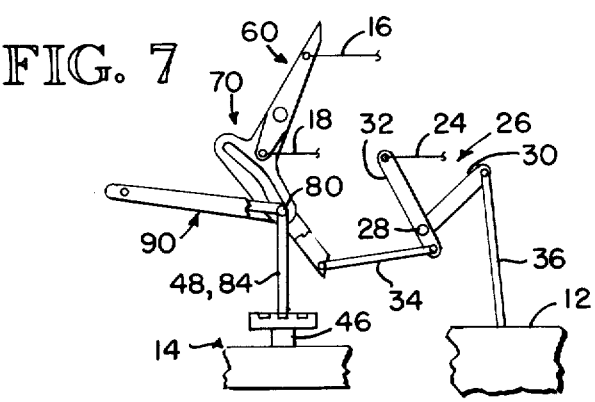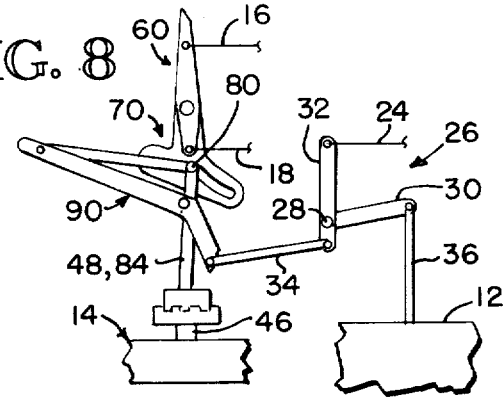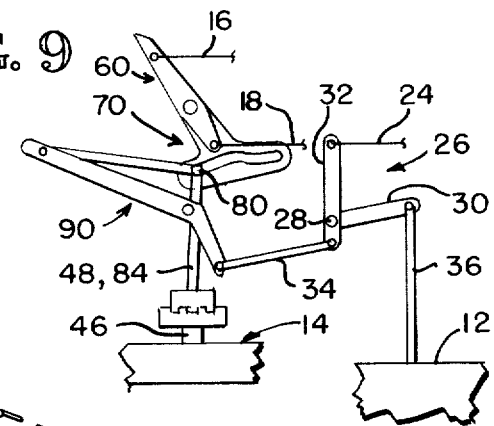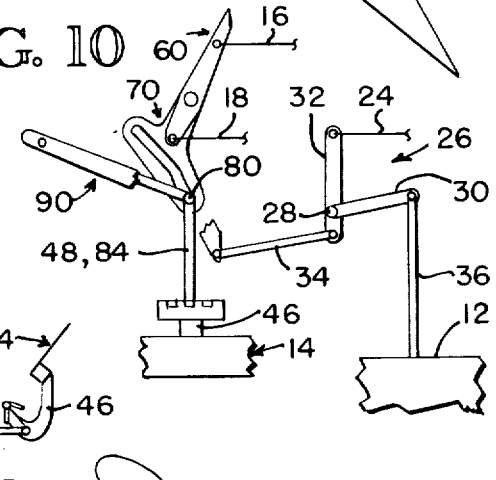

SPOILER CONTROL SYSTEM

BACKGROUND OF THE INVENTION

The invention relates generally to roll control spoilers for aircraft and more particularly to a novel spoiler control system.

It is well known to those versed in the art of applied aerodynamics that spoilers constitute an effective and efficient means for altering the aerodynamic characteristics of a wing, particularly as an effective means for providing control of an aircraft about its longitudinal or rolling axis. It is common in the art to provide movable trailing edge flaps on the wings of airplanes for the purpose of producing a higher coefficient of lift than the wing could produce without the use of flaps. Furthermore, it is known that it is advantageous to have the flaps extend across as much of the lateral span of the wing as possible considering all requirements other than high coefficients of lift. One such requirement is the necessity for effective roll control, most commonly provided by ailerons.

The use of spoilers in place of ailerons for rolls control is well known. As is also well recognized, the aerodynamic loading on the active or up spoiler tends to displace the spoiler "up" which causes a decentering moment on the control wheel. Thus, the problem becomes in manually powered spoiler roll control systems to counteract the decentering moments in order to obtain satisfactory cockpit control characteristics. Further recognized of course, is the fact that the decentering moment from the upwardly-moving spoiler into the control system increases as the wing flaps are deployed downwardly. As the flaps extend to full down position the decentering moment also increases to its maximum. Stated another way, spoiler control has a much larger decentering moment to contend with when the flaps are down than when the flaps are retracted.

Various solutions to counteract the decentering moment on the spoilers have been tried. Springs have been employed in control systems but they have disadvantages if they are the only means in the system. So-called "Q" springs are used in many forms but they have not proved to be satisfactory in contributing to proper cockpit control feel. One approach in the prior art has been to use spoilers with the flaps out but, upon retraction of the flaps, these spoilers become a fixed part of the wing because ailerons are incorporated in the back of the flap. In other words, roll control is provided by the ailerons with the flaps up and by spoilers or a combination of spoilers and ailerons with the flaps down. Another aircraft manufacturer has a set relationship of active spoiler motion to inactive spoiler motion in response to control wheel movement. This constant schedule of up and down spoiler movement with respect to each other pertains regardless of whether the wing flaps are retracted or extended. Large commercial and military aircraft have used power spoiler control systems, but no manual spoiler control systems are known which generate a different schedule of control inputs with flaps extended.

The only known patent which is related in U.S. Pat. No. 3,184,186.

SUMMARY OF THE INVENTION

The invention herein is directed to a control system for roll control spoilers of a fixed wing aircraft. The spoilers are hingedly mounted on the upper surface of the air foil forward of the wing flaps. A spoiler actuating mechanism is connected to a bell crank which is controlled by clockpit cables. The bell crank includes a cam with a shifting connecting point to the actuating mechanism. When the cam is turned in one direction by the bell crank the spoiler is raised and when the cam is turned in the other direction the spoiler is lowered by a lesser amount. The wing flap is connected to an interconnect lever which includes a clevis which clevis has a common point of engagement with the actuating mechanism cam connection. The interconnection between the flaps and clevis permits a shifting connection with the cam according to the degree of deployment of the wing flaps. With retracted flaps the downward movement of the spoiler is minimum. The shifting connection is moved in the cam such that the spoiler lowering movement is increased as the flaps are extended from full up to full down.

Accordingly, it is among the many features, objects and advantages of this invention to provide a spoiler control system which provides a counteracting centering moment from the aerodynamically inactive spoiler to balance the decentering moment from the aerodynamically active spoiler. The invention turns the hinge moment characteristic of the spoiler to the pilot's advantage by providing proper roll control "feel" to the cockpit controls without resorting to the use of ailerons in addition the spoilers. The system is particularly effective since it provides an increasing centering moment as the flaps are extended to the point where maximum centering moment is provided with full extended flaps. The system is uniquely simple, and can be adapted to existing aircraft wings as well as in the wings of new aircraft. The system can be incorporated in an aircraft wing without decreasing the aerodynamic effectiveness or strength of the wing. The control system of this invention is of uniquely simple construction and low installation cost.

BRIEF DESCRIPTION OF DRAWINGS

FIGS. 5 through 10A are schematic, left wing diagrams showing details of the control system operation and interrelation of parts both with flaps up and flaps down.

DESCRIPTION OF PREFERRED EMBODIMENT

Figure 1:
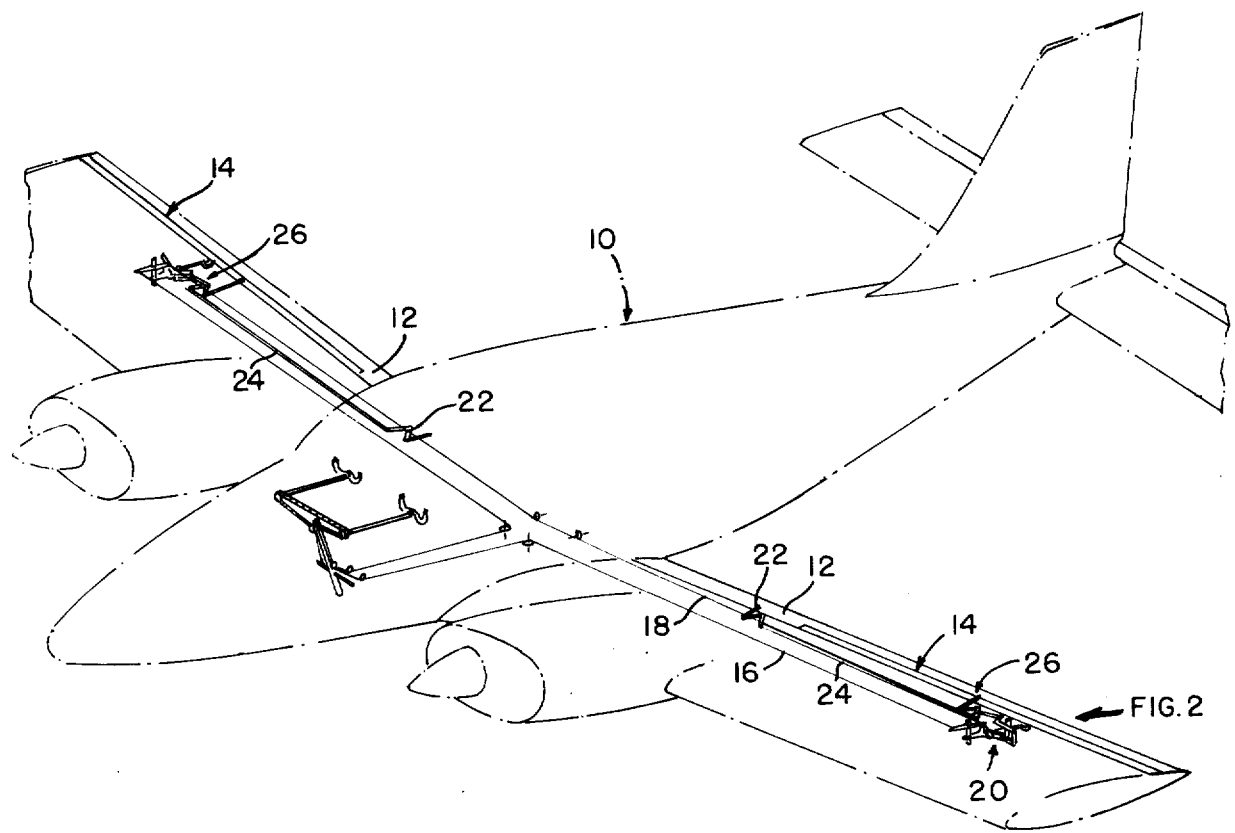
FIG. 1 is a diagrammatic, environmental view showing a typical light aircraft installation of this control system.
Figure 2:
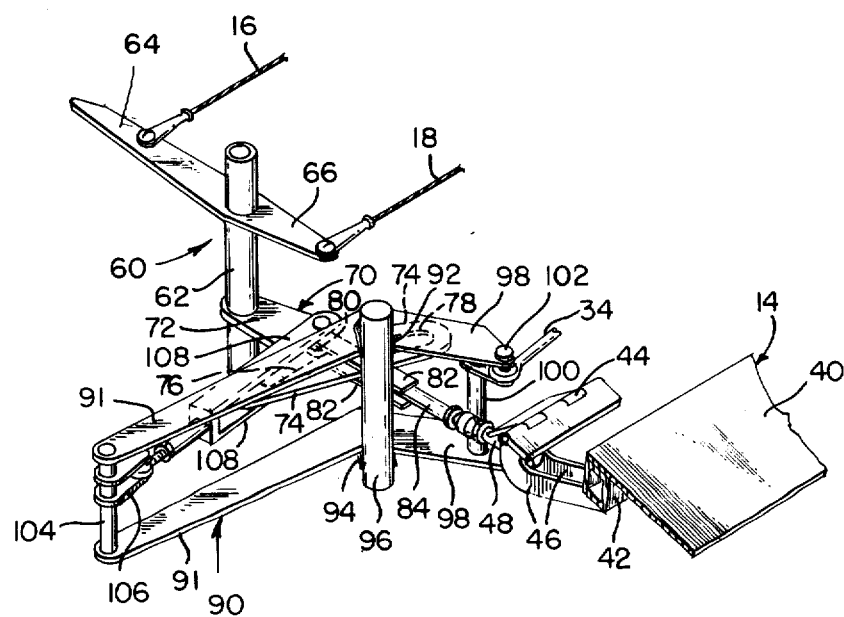
FIG. 2 is a perspective view of the control system to show details of its construction.

It will be seen by reference to FIGS. 1 to 4 that aircraft 10 has full span flaps 12 and roll control spoilers 14. Control cables 16 and 18 extend from the cockpit controls to the spoiler control system in the wing, and which spoiler control system is generally designated by the number 20.

Each wing has a bell crank mechanism 26 which connects to wing flap 12. Bell crank 26 pivots as at 28 and has connector arm 30 and crank arm 32 disposed at an angle to each other. A rod 24 from an inboard bell crank pivotally attaches to the long end of crank arm 32. An adjustable push rod 34 pivotally connects to the shorter end of arm 32. A flap actuator rod 36 pivotally attaches to connector arm 30 and at its other end to flap 12.

Figure 4:
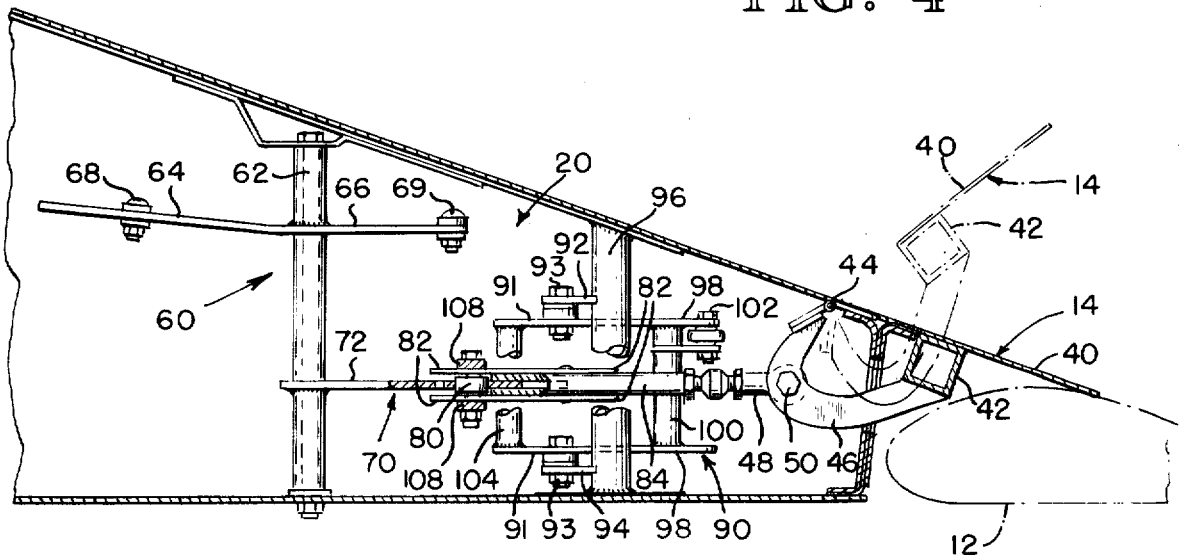
FIG. 4 is a side elevation view of the system further showing details of construction and operation.

The spoiler 14 is an elongated member comprising flat surface 40 and rigidizing member 42 shown as a square tubular member on the underside of the leading edge of the spoiler. FIG. 4 particularly shows in solid lines spoiler 14 in position in neutral position covering or occupying the slot above and in front of flap 12. The spoiler is hingedly mounted at hinge pivot 44 and an arcuate hinge arm 46 interconnects hinge pivot 44 and the rigidizing member 42. It will be appreciated that the rigidizing member 42 extends the full length of the spoiler 14 and that there will be several hinge mounting locations along the length of the spoiler. However, only one control system 20 is needed for each wing. A spoiler actuator arm 48 is pivotally connected as at 50 to arm 46 of spoiler 14.

A spoiler bell crank, generally designated by the number 60, is positioned in the wing as will now be described. A vertical pivot column 62 has rigidly connected thereto a bell crank arm having an "up" cable arm 64 and "down" cable arm 66. Located below and in spaced relation to arm 66 and rigidly connected to column 62 is a cam device generally designated by the number 70. Cam device 70 has a support section 72 rigidly attached to column 62 and then enlarges into cam section 74.

Figure 3:
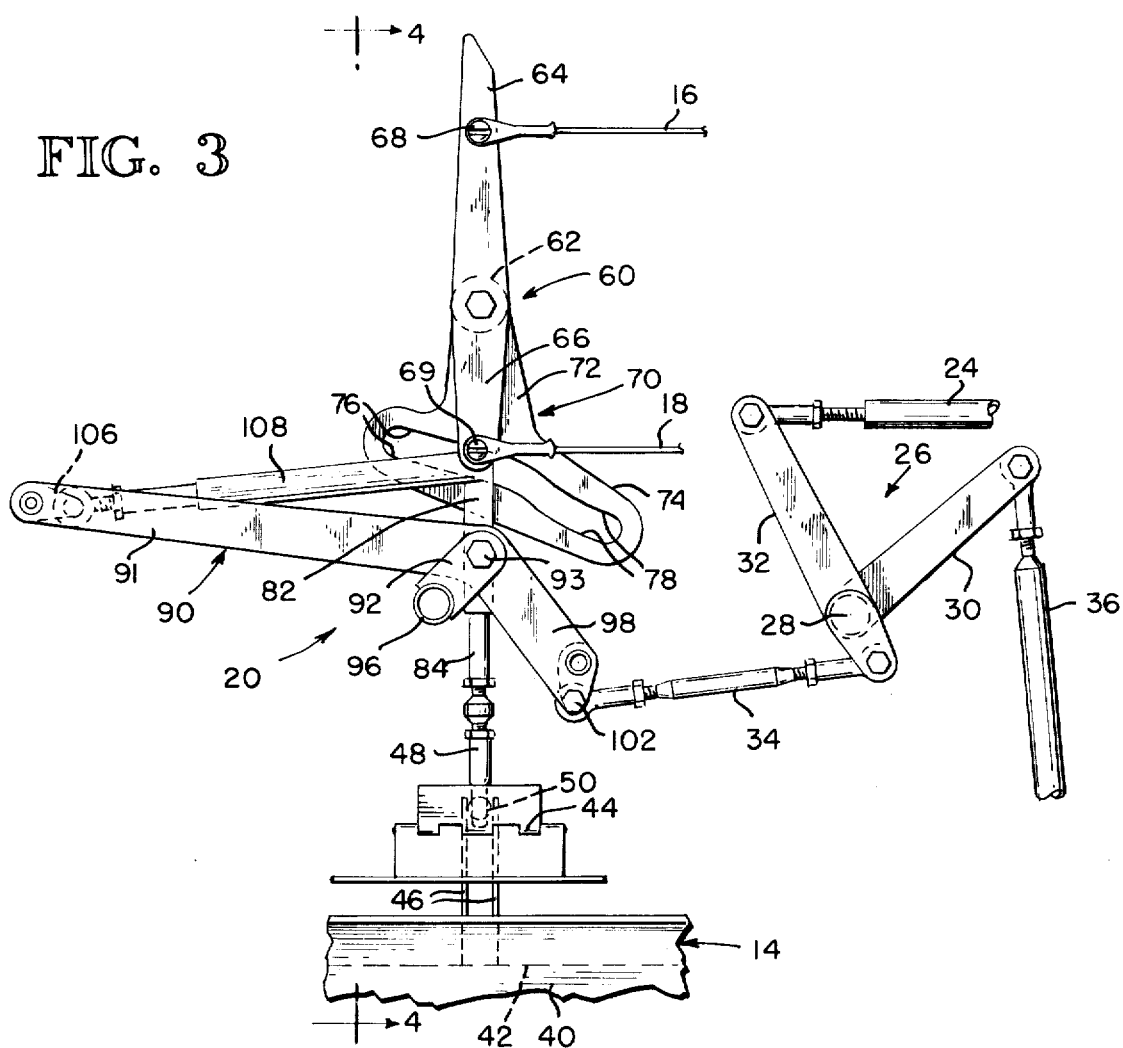
FIG. 3 is a top plan view of the control system showing further details of its construction.

Cam device 70 is in approximately the same plane as spoiler push rod 48 and within cam section 74 are the cam tracks for raising or lowering the spoilers. In FIG. 3, looking down on the cam, it will be seen that cam section 74 has down cam track section 76 and up cam track section 78. Engaging cam tracks 76 and 78 is a cam follower or roller 80 best seen in FIG. 4. Roller 80 is supported between cam follower assembly arms 82 which in turn have supported therebetween a bar 84 connected to spoiler push rod 48. Roller 80, arms 82, bar 84 and push rod 48 comprise together a cam follower assembly constituting a spoiler actuating mechanism. If down cable 18 is pulled to the right, reference being had to FIG. 3, cam device 70 is moved to the right exerting a pulling force on the actuating mechanism to force the spoiler into a down attitude. In like manner if up cable 16 is actuated, reference again being had to FIG. 3, the cam device is rotated clockwise and cam track section 78 will force the cam follower assembly outwardly. In this way, the actuating rod 48 will push the spoiler up into its active position.

In order to influence the amount of down spoiler travel with flap movement the flap bell crank mechanism 26 is interconnected with the cam follower assembly. A double armed interconnect lever, generally designated by the number 90, is mounted for limited pivotal movement about pivot 93. Interconnect lever 90 is pivotally mounted on brackets 92 and 94 which are rigidly secured to a column 96. The spaced apart arms 91 of interconnect lever 90 have flap arm sections 98 extending to the flap bell crank side of the control system at an inwardly and rearwardly extending angle from the pivot axis 93. Interconnecting the upper and lower arms 91 is spacer frame member 100. Push rod 34 extending from the flap bell crank unit 26 connects to interconnect lever flap arm 98 at 102. Interconnect lever 90 also has longer radius arms 91 rigidly interconnected at the outer end thereof by spacer frame member 104. A mounting bracket 106 is rigidly connected to spacer 104 and pivotally mounted thereto is a clevis assembly having upper and lower arms 108. Cam follower assembly arms 82 and clevis arms 108 are generally co-axially aligned with roller 80. Accordingly, it will be understood that as flap 12 is extended flap bell crank arm 30 is rotated clockwise as is flap bell crank arm 32 about pivot 28. Push rod 34 is moved to the left to rotate interconnect lever 90 about its pivot point 93 such that it is moved a limited distance in a clockwise direction. Movement of interconnect lever 90 shifts roller 80 to the right from the position shown in FIG. 3 as will now be described.

FIGS. 5 through 10A have been simplified in order to more easily described the operation of the control system of this invention. The diagrammatics are for the left wing spoiler and flap. FIG. 5 shows a flaps up deployment with the spoilers in neutral position. As seen in FIG. 5A the spoiler will be down in the position generally as indicated. FIGS. 6 and 6A illustrate what happens within the system when the right spoiler is raised and the left spoiler lowered with flaps up. Bell crank 60 is rotated so that cam device 70 rotates counterclockwise to lower the left spoiler. Since the flaps are up and the trailing edge of the spoiler is resting on the upper surface of the flap, the tendency is for the spoiler to deflect along its length. The deflection of the spoiler acts to create a mechanical centering moment to counteract the decentering moment on the active spoiler. FIGS. 7 and 7A show the bell crak mechanism rotated clockwise to bring into operation the raise section of the cam track and illustrate the left spoiler being up in active position with the flaps again full retracted.

FIGS. 8 through 10A illustrate the effect of flaps down within the spoiler control system. In FIGS. 8 and 8A the movement of flap 12 into its down position rotates interconnect lever and moves roller 80 in the cam track to the right of the position as shown in FIG. 3. The shift in position of roller 80 in the cam track is to position the roller in the cam track in such a way that when the spoiler is moved down into inactive position it is actually moved further than it would be with flaps up. With flaps down and both spoilers in their neutral positions, roller 80 forming a shifting connection has moved to the right. It will be apparent that a certain amount of curvature exists near the center of the cam. Extending the flaps shifts roller connection 80 enough to the right along the curve so that upon moving the spoiler to inactive position by rotating the cam greater downward movement of the spoiler is accomplished. In FIGS. 9 and 9A the left spoiler is shown to be moved downwardly into its inactive position. Again, the shifting connection or roller 80 has been moved to the right by the flaps down deployment. Moving the cam device for down spoiler actuation rides roller 80 over a great cam angle and increases the amount of downward movement of the inactive spoiler. Because the decentering moments are greater with flaps with down than with flaps up, it is necessary to increase the centering moment and this is accomplished by increasing the amount of its downwardly movement. FIGS. 10 and 10A show raising with flaps down again to illustrate the aspect of the control system.

What is claimed is:

1. In a control system for aircraft wing spoilers wherein said aircraft includes wings provided with flaps and also includes manual cockpit controls which are operatively connected to said spoilers and flaps, and wherein said spoilers are hingedly mounted in said wings forward of the wing flaps and are the sole means of aircraft roll control, the improvements comprising:

a. actuating mechanism for deploying said wing spoilers either up into active position from a neutral position to become an active spoiler for aircraft roll control, or downward from the neutral position into an inactive position to become an inactive spoiler for providing a centering moment to the aircraft cockpit controls, b. a first means connected to said actuating mechanism for moving one of the spoilers downwardly into the inactive position a lesser amount than the others of the spoilers is moved up into the active position, said first means including a differential portion and a shifting connection to said actuating mechanism for altering the amount of downward movement of the inactive spoiler according to the position of the wing flaps, and c. second means interconnecting said wing flaps and the differential portion of said first means such that as the wing flaps are extended from their retracted position to full down position the amount of downward movement of the inactive spoiler is increased from minimum to maximum to thereby increase the amount of centering moment in accordance with the amount of decentering moment on the active spoiler and to also thereby impart balanced forces for proper feel to the aircraft cockpit controls.

2. The spoiler control system of claim 1 and wherein said differential portion of said first means is a cam device for each spoiler with which said spoiler actuating mechanism has said shifting connection, said spoiler actuating mechanism connection to said cam device being altered by movement of said wing flaps.

3. The spoiler control system of claim 2 and in which said second means includes a pivotal interconnect lever means for each spoiler operably interconnected to said wing flaps, said interconnect lever means having a clevis for engaging said cam device, said clevis and said spoiler actuating mechanism having a generally common point of engagement forming said shifting connection with said cam device so that wing flap position operably affects and determines the amount of downward spoiler movement.

4. The spoiler control system of claim 3 and in which said cam device is generally rigidly attached to a pivotal spoiler bell crank means, said spoiler bell crank means being connected to cable from said cockpit controls, said cam device being formed such that as the wing flaps are extended from full up to full down position said shifting connection is moved to allow increasingly greater downward movement of the inactive spoiler by said spoiler actuating mechanism.

5. The spoiler control system of claim 4 and in which said cam device is formed so that when said spoiler bell crank means is pivoted in one direction by said cockpit control means said spoiler is raised into the active position by said actuating mechanism and when pivoted in the opposite direction said spoiler is lowered into the inactive position as determined by the position on said cam device of said shifting connection.

6. In a control system for aircraft wing spoilers wherein said aircraft includes wings provided with flaps and also includes manual cockpit control which are operatively connected to said spoilers and flaps, and wherein said spoilers are hingedly mounted in said wings forward of the wing flaps and are the sole means of aircraft roll control, the improvements comprising:

a. actuating mechanism for deploying said wing spoilers either up into active position from a neutral position to become an active spoiler for aircraft roll control, or downward from the neutral position into an inactive position to become an inactive spoiler for providing a centering moment to the aircraft cockpit controls, b. a first means having a shifting connection to said actuating mechanism for moving one of the spoilers downwardly into the inactive position and the other of the spoilers upwardly into the active position, said first means including a differential portion with which said shifting connection is engaged, c. second means interconnecting said wing flaps and the shifting connection of said first means, and d. said differential portion of said first means being so formed that with said wing flaps retracted the shifting connection is located in said differential portion such that minimum downward movement is imparted to the inactive spoiler by said actuating mechanism, and so that with the wing flaps extended the shifting connection is located in said differential portion such that maximum downward movement is imparted to the inactive spoiler by said actuating mechanism, whereby the amount of centering moment on the inactive spoiler is increased in accordance with the amount of decentering moment on the active spoiler to thereby impart balanced forces for proper feel to the aircraft cockpit controls.

7. The spoiler control system of claim 6 and wherein said differential portion of said first means is a cam device for each spoiler having a first cam track section for raising the spoiler and a second cam track section for lowering the spoiler a lesser amount than the spoiler can be raised.

8. The spoiler control system of claim 7 and in which said second means includes a pivotal interconnect lever means for each spoiler operably interconnected to said wing flaps, said interconnect lever means having a clevis for engaging said cam device, said clevis and said spoiler actuating mechanism having a generally common point of engagment comprising said shifting connection with said cam device so that wing flap position operably affects and determines the amount of downward spoiler movement.

9. The spoiler control system of claim 8 and in which said cam device is attached to a pivotal spoiler bell crank means said spoiler bell crank means being connected to cockpit control cables whereby one of said first and second cam track sections is made operable with respect to said shifting connection to raise or lower said spoiler.

10. The spoiler control system of claim 9 and in which said cam device is rigidly attached to said spoiler bell crank means so that when the spoiler bell crank means is pivoted in one direction by said cockpit control cables one of the spoilers is raised into the active position and when pivoted in the opposite direction the one spoiler is lowered into the inactive position according to the position on said cam device of said shifting connection as determined by wing flap deployment.

* * * * *